(12) United States Patent
Yoakum et al.

(10) Patent No.: US 7,512,226 B1
(45) Date of Patent: Mar. 31, 2009

(54) IP-CENTRIC SPEED DIAL

(75) Inventors: John H. Yoakum, Cary, NC (US);
Gordon Quinn, Plano, TX (US);
Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 1017 days.

(21) Appl. No.: 10/647,999

(22) Filed: Aug. 26, 2003

(51) Int. Cl.
*H04M 1/00* (2006.01)

(52) U.S. Cl. .................... 379/355.01; 379/355.03; 379/355.04; 370/352

(58) Field of Classification Search ............ 379/355.01, 379/355.03, 355.04; 370/352, 353, 354, 370/355
See application file for complete search history.

(56) References Cited

U.S. PATENT DOCUMENTS

2003/0023748 A1* 1/2003 Takemoto et al. .......... 709/238
2004/0120502 A1* 6/2004 Strathmeyer et al. ... 379/265.01

OTHER PUBLICATIONS

AT&T All In One: Call Management Features [online], 2006 [retrieved on Apr. 24, 2006]. Retrieved from http://www.att.com/smbcc/aio/aio_callmgmt.html. Section entitled Speed Dialing.*

* cited by examiner

*Primary Examiner*—Walter F Briney, III
(74) *Attorney, Agent, or Firm*—Withrow & Terranova, P.L.L.C.

(57) ABSTRACT

The present invention provides speed dial capability for traditional telephones, which are coupled to a terminal adaptor to facilitate calls over a packet network. In operation, the terminal adaptor will receive a speed dial code, such as 12#, from a traditional telephone and use the speed dial code to attempt to initiate a session over the packet network. A proxy will intercept the session request, recognize the speed dial code in the session request, and access an address associated with the speed dial code. The proxy will then use the address corresponding to the speed dial code to initiate a session between the terminal adaptor and another device to facilitate the call. The terminal adaptor will provide the necessary translation between the packet network and the traditional telephony interface to which the traditional telephone is coupled.

39 Claims, 4 Drawing Sheets

IP-CENTRIC SPEED DIAL

FIELD OF THE INVENTION

The present invention relates to telephone communications, and in particular to providing speed dial functionality in an Internet Protocol (IP) telephony environment.

BACKGROUND OF THE INVENTION

Traditional telephony systems provide telephones that are loosely associated with specific users and are represented by numeric addresses in a coordinated, global numbering plan. Modern telephones generally have a simple keypad with ten digits and two special symbols, * and #, to initiate calls. These calls support and are generally limited to voice sessions.

In the world of Internet communications, a voice session is just one of numerous types of media sessions. Given the dominance of voice-based communications, many IP-based multimedia communication networks will start out with voice as the dominant media. As such, it is predicted that a significant community of initial users will find it attractive to use their familiar, traditional telephone sets, in conjunction with an adaptor that effectively provides a gateway between the traditional telephone and an IP network over which calls may be initiated and received.

IP networks typically use very flexible hierarchical alphanumeric addressing systems where a user's personal identity is associated with a domain identity. The user addresses or identities are often lengthy, complex, and include not only a significant number of letters, but also characters such as dashes, the at symbol @, and periods. Accordingly, simplistic number dialing that is easily accomplished from the keypads of traditional telephones is not sufficient for effective and ready initiation of calls that are not associated with a traditional directory number.

Due to the inherent complexity of the alphanumeric addressing scheme of IP networks, most of these IP networks use directory structures to store and rapidly call frequently accessed contacts. Often, these directories are made visible on a display of a user's client terminal and users can simply click on a contact, or scroll through a directory list to select the desired contact and initiate a call thereto.

Traditional telephony devices are normally only configured to generate a serialized number pattern to initiate a call. Further, to assist users in maintaining the efficient dialing of directory numbers, speed dialing has been implemented using both telephone-specific and network-centralized techniques. In general, speed dialing allows a user to input an abbreviated number sequence, generally with at least one special symbol, to initiate the dialing of a corresponding directory number. Unfortunately, such speed dialing is not available in an IP communication environment for those users having traditional telephony equipment coupled to the IP network via a terminal adaptor. Accordingly, there is a need for providing an effective speed dialing system for such users to afford the traditional benefits of speed dialing as well as overcome the difficulties in entering an alphanumeric address for the user.

SUMMARY OF THE INVENTION

The present invention provides speed dial capability for traditional telephony devices, which are coupled to a terminal adaptor to facilitate calls over a packet network. In operation, the terminal adaptor will receive a speed dial code, such as 12#, from a traditional telephony device and use the speed dial code to attempt to initiate a session over the packet network. A calling party proxy will intercept the session request, recognize the speed dial code in the session request, and access an address, such as a Uniform (or Universal) Resource Locator (URL), IP address, or like identifier, associated with the speed dial code. The calling party proxy will then use the address corresponding to the speed dial code to initiate a session between the terminal adaptor and another device to facilitate the call. The terminal adaptor will provide the necessary translation between the packet network and the traditional telephony interface to which the traditional telephone device is coupled. The calling party proxy functionality may be implemented in a separate device or within the terminal adaptor itself. Providing speed dial capability for a traditional telephone device that is connected to a terminal adaptor to facilitate packet-based calls overcomes the complexity and difficulty associated with entering addresses for called parties, especially when the address include characters other than numeric characters.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
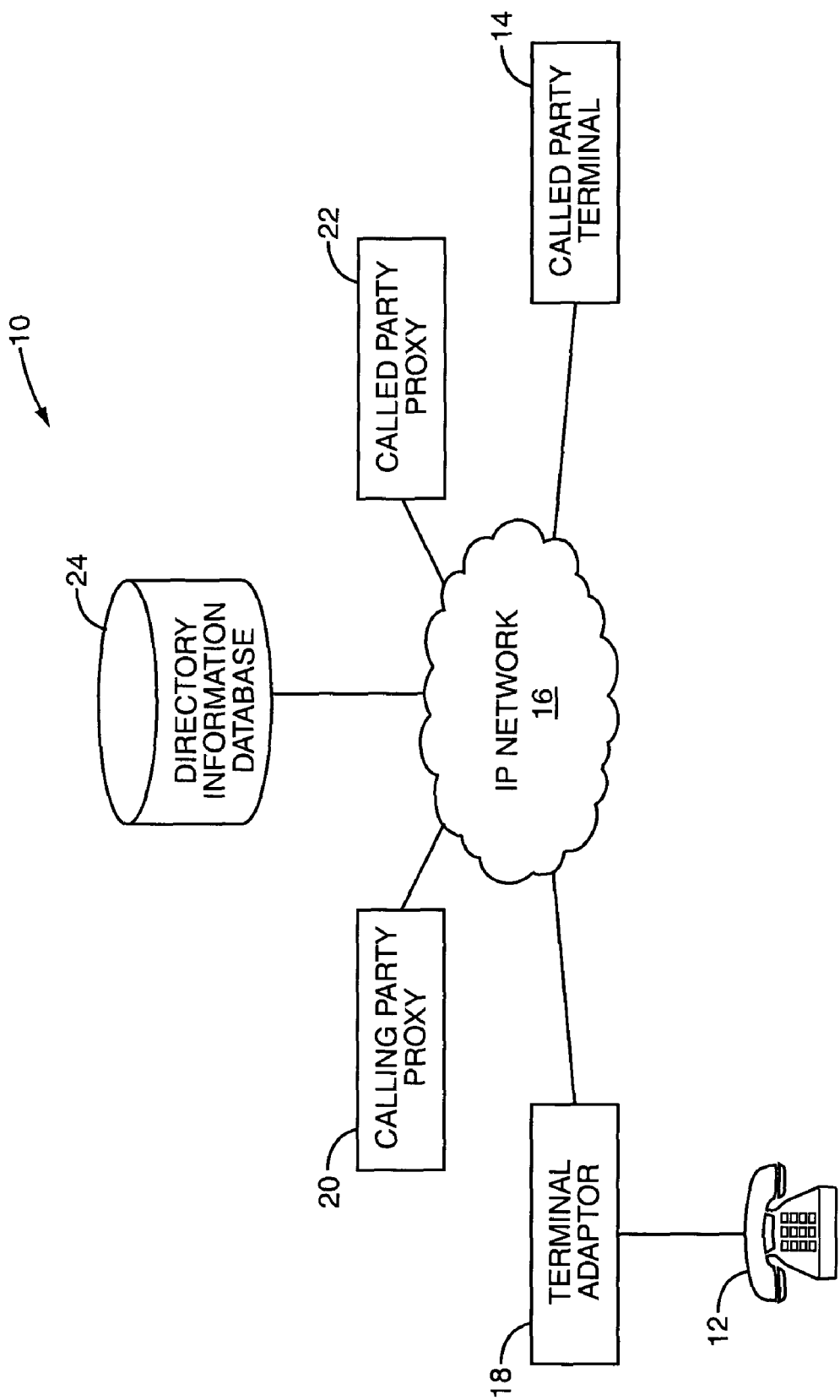
FIG. 1 is a block representation of a communication environment according to one embodiment of the present invention.

With reference to FIG. 1, a communication environment 10 is illustrated according to one embodiment of the present invention. In this embodiment, a traditional telephone 12 is able to use speed dialing to initiate a call to a called party terminal 14 over an IP network 16. A terminal adaptor 18 provides an interface to the IP network 16 or the traditional telephone 12. The terminal adaptor 18 will effectively interact with the traditional telephone 12 to receive and provide the necessary telephone line interface and all associated tones, signals, and voice formatting to emulate a traditional telephony switch interface. Further, the terminal adaptor 18 will support packet-based communications over the IP network 16 and provide the necessary translation between the traditional telephony interface provided to the traditional telephone 12 and the IP interface provided to the IP network 16. Those skilled in the art will recognize various ways to implement this gateway function in the terminal adaptor 18.

In one embodiment, session initiation and establishment implements a calling party over proxy 20, which simply acts as a session proxy for the terminal adaptor 18 and indirectly for the traditional telephone 12. Generally, session initiation and establishment messages sent from the terminal adaptor 18 are received by the calling party proxy 20 where they are processed and forwarded as necessary to an appropriate called party proxy 22, which acts as a proxy for the called party terminal 14. Those skilled in the art will recognize that both the calling party proxy 20 and the called party proxy 22 are optional, and the functionality thereof may be implemented in other devices. For instance, the functionality of the calling party proxy 20 may be implemented directly in the terminal adaptor 18. Thus, in the embodiment illustrated in FIG. 1, the calling proxy 20 and called party proxy 22 act as proxies capable of supporting the initiation and establishment of sessions between the terminal adaptor 18 and the called party terminal 14 over the IP network 16. In a similar manner, the terminal adaptor 18 or called party terminal 14 may be implemented in other devices.

A directory information database 24 is provided to store IP-based addresses for various IP devices, including the called party terminal 14, in association with speed dial codes. These speed dial codes correspond to speed dial codes that may be dialed at the traditional telephone 12 using a traditional keypad. When a speed dial code by a user at the traditional telephone 12, the speed dial code is recognized by the terminal adaptor 18 as both a speed dial code, and alone or in combination with other actions, an attempt to initiate a call to an entity associated with the speed dial code. The terminal adaptor 18 will then send a session initiation message to initiate a call to a terminal associated with the speed dial code. The session initiation message is received by the calling party proxy 20, which recognizes that a speed dial code has been used by the user to initiate the call, and will then access the directory information database 24 to obtain an appropriate address to use for initiating a call to the called party terminal 14. The calling party proxy 20 will receive the address for the called party from the directory information database 24 and send a session initiation message toward the called party terminal 14 using the retrieved address for the called party. The called party proxy 22 may receive the session initiation message sent by the calling party proxy 20, identify the address for the called party terminal 14, and forward the session initiation message or otherwise interact with the called party terminal 14 to take the necessary steps to initiate the voice session (or call).

In a preferred embodiment of the present invention, the session initiation protocol (SIP) is used to establish voice sessions and any other associated media sessions over the IP network 16. The specification for SIP is provided in the Internet Engineering Task Force's RFC 2543: Session Initiation Protocol Internet Draft, which is incorporated herein by reference in its entirety.

In general, a SIP proxy, such as may be provided by the calling party proxy 20 and called party proxy 22, may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the traditional telephone 12.

A SIP endpoint is generally capable of running an application, which is generally referred to as a user agent (UA), and is capable of facilitating media sessions using SIP. User agents register their ability to establish sessions with a SIP proxy by sending "REGISTER" messages to the SIP proxy. The REGISTER message informs the SIP proxy of the SIP URL that identifies the user agent to the SIP network. The REGISTER message also contains information about how to reach specific user agents over the SIP network, by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a "200 OK" message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

Figure 2:
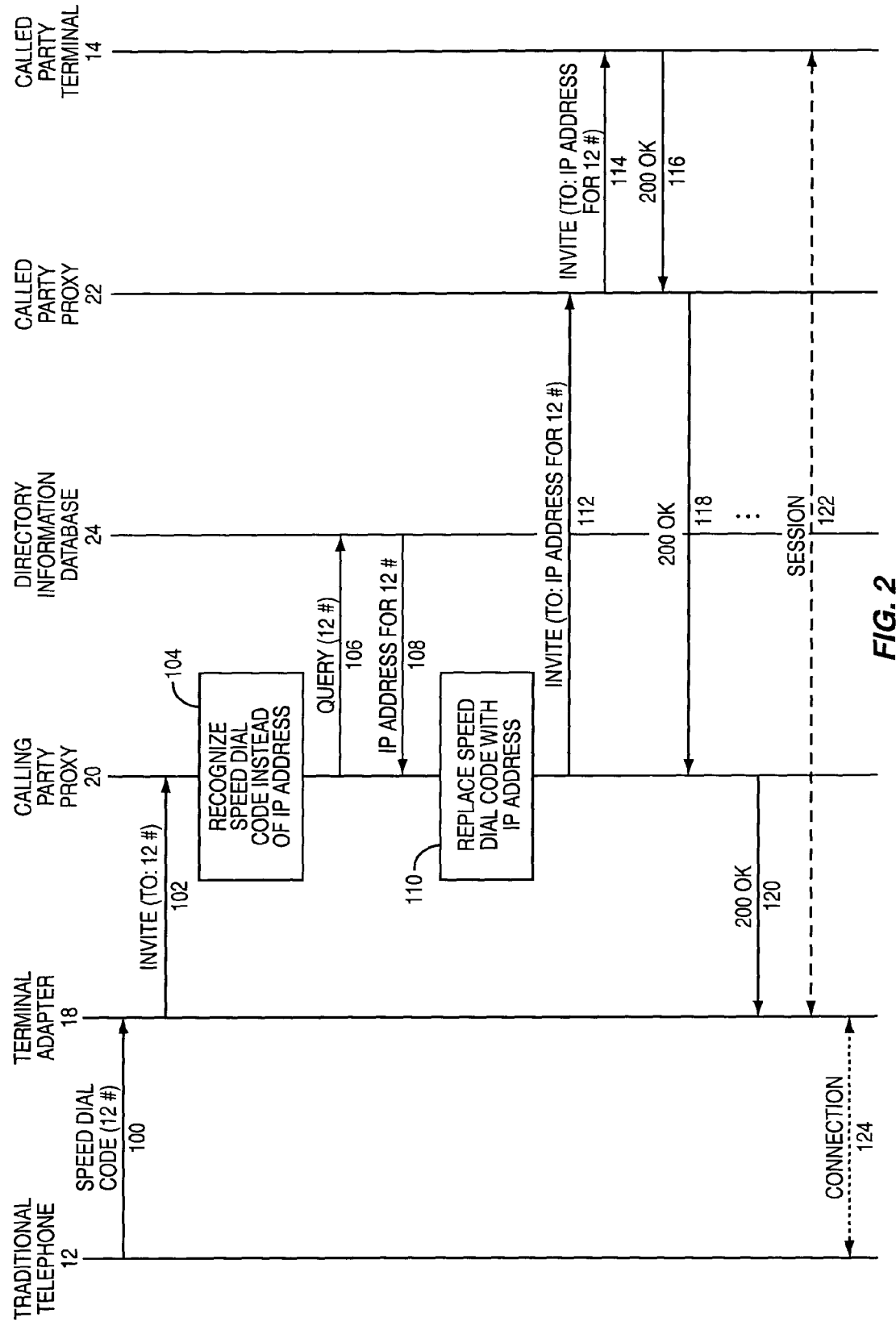
FIG. 2 is a call flow diagram illustrating the operation of the present invention according to one embodiment.

With reference to FIG. 2, an exemplary call initiation using speed dial codes is illustrated according to one embodiment of the present invention. The process starts when a user at the traditional telephone 12 picks up the handset and dials a speed dial code (12#) (step 100). The terminal adaptor 18 will detect the traditional telephone 12 going off hook, analyze the incoming digits dialed by the user, and recognize that the dialed digits corresponds to a speed dial code. As such, the terminal adaptor 18 will initiate an INVITE message including the speed dial code to the calling party proxy 20 (step 102). In the illustrated embodiment, the "TO:" field is populated with the speed dial code. In traditional proxy fashion, the calling party proxy 20 will receive the INVITE sent by the terminal adaptor 18. The calling party proxy 20 is adapted to recognize that the "TO:" field is populated by a speed dial code instead of a normal address with which a session can be initiated (step 104). Upon recognizing the presence of a speed dial code in the INVITE message, the calling party proxy 20 will send a query including the speed dial code to the directory information database 24 (step 106), which will access an address corresponding to the speed dial code and sent it back to the calling party proxy 20 (step 108). Notably, the user may configure the directory information database 24 through a web interface, directly or indirectly through the terminal adaptor 18. Those skilled in the art will recognize other techniques for populating the directory information database 24 with corresponding speed dial codes and addresses.

Upon receipt of the address from the directory information database 24, the calling party proxy 20 will replace the speed dial code in the "TO:" field of the INVITE message with the corresponding address (step 110) and send the modified INVITE message toward the called party terminal 14 (step 112). The INVITE message may be received by the called party proxy 22, which will forward the INVITE message to the called party terminal 14, which is associated with the address corresponding to the speed dial code dialed by the user (step 114). In response, the called party terminal 14 may send a 200 OK message back to the called party proxy 22 (step 116), which will forward the 200 OK message to the calling party proxy 20 (step 118). The calling party proxy 20 will forward the 200 OK message to the terminal adaptor 18 to alert the terminal adaptor 18 that the session is being initiated (step 120). At this point, a session between the terminal adaptor 18 and the called party terminal 14 can be established (step 122), and the terminal adaptor 18 can take the necessary steps to effect a voice connection with the traditional telephone 12 (step 124) to facilitate the call. Those skilled in the art will recognize alternate session initiation messaging protocols, as well as recognizing that additional messaging in SIP or other protocols may be necessary in various environments to allow the sessions to be established between the terminal adaptor 18 and the called party terminal 14. These sessions may be facilitated substantially directly therebetween or through the respective proxies. Once the session between the terminal adaptor 18 and the called party terminal 14 is established and the connection with the traditional telephone 12 is established, the terminal adaptor 18 will provide the necessary translations required for interfacing with the traditional telephone 12 and the packet network 16. Further, the calling party proxy functionality may be implemented in whole or in part in the terminal adaptor 18 as noted above.

Figure 3:
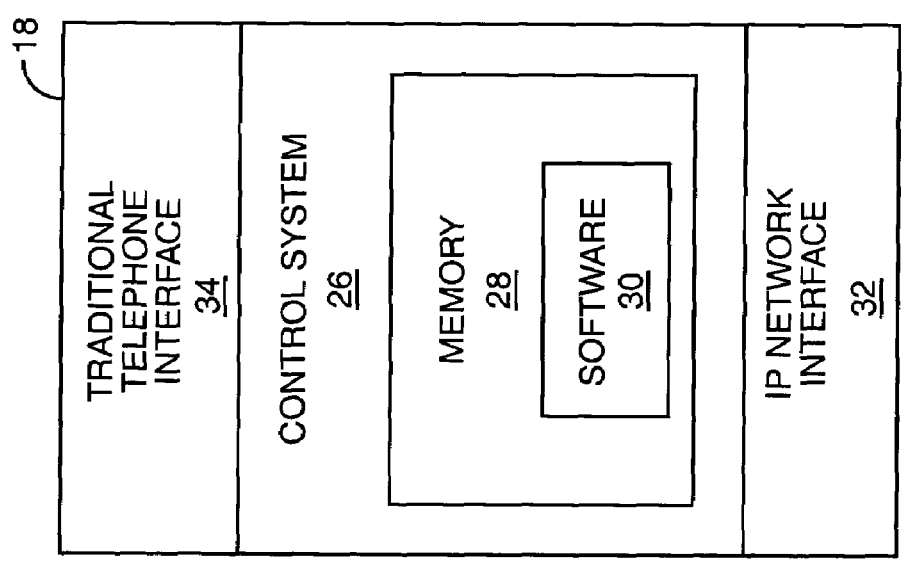
FIG. 3 is a block representation of a terminal adaptor according to one embodiment of the present invention.

FIG. 3 provides a block representation of a terminal adaptor 18 configured according to one embodiment of the present invention. The terminal adaptor 18 will generally include a control system 26 with sufficient memory 28 for software 30 configured to provide the above-described functionality. The control system 26 will cooperate with an IP network interface 32 to facilitate packet-based communications over the IP network 16 as well as a traditional telephony interface 34 for interfacing with the traditional telephone 12. Again, the software 30 may be configured to provide a portion or all of the functionality associated with the calling party proxy 20.

Figure 4:
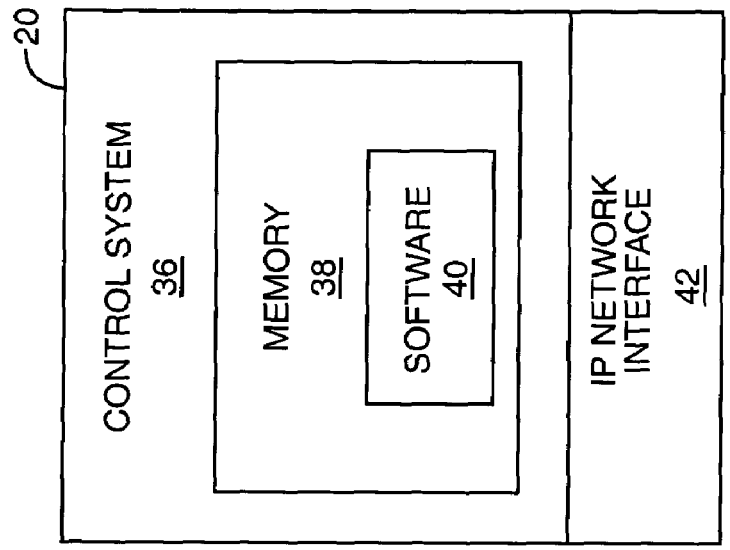
FIG. 4 is a block representation of a calling party proxy according to one embodiment of the present invention.

Turning now to FIG. 4, a block representation of a dedicated calling party proxy 20 is illustrated to include a control system 36 having memory 38 for software 40 to provide the above-described functionality. The control system 36 will be associated with an IP network interface 42 for communicating over the IP network 16, which allows for communications with the directory information database 24, the terminal adaptor 18, the called party proxy 22, called party terminal 14, and other packet-based devices. The called party proxy 22 may be configured similarly to the calling party proxy 20.

Figure 5:
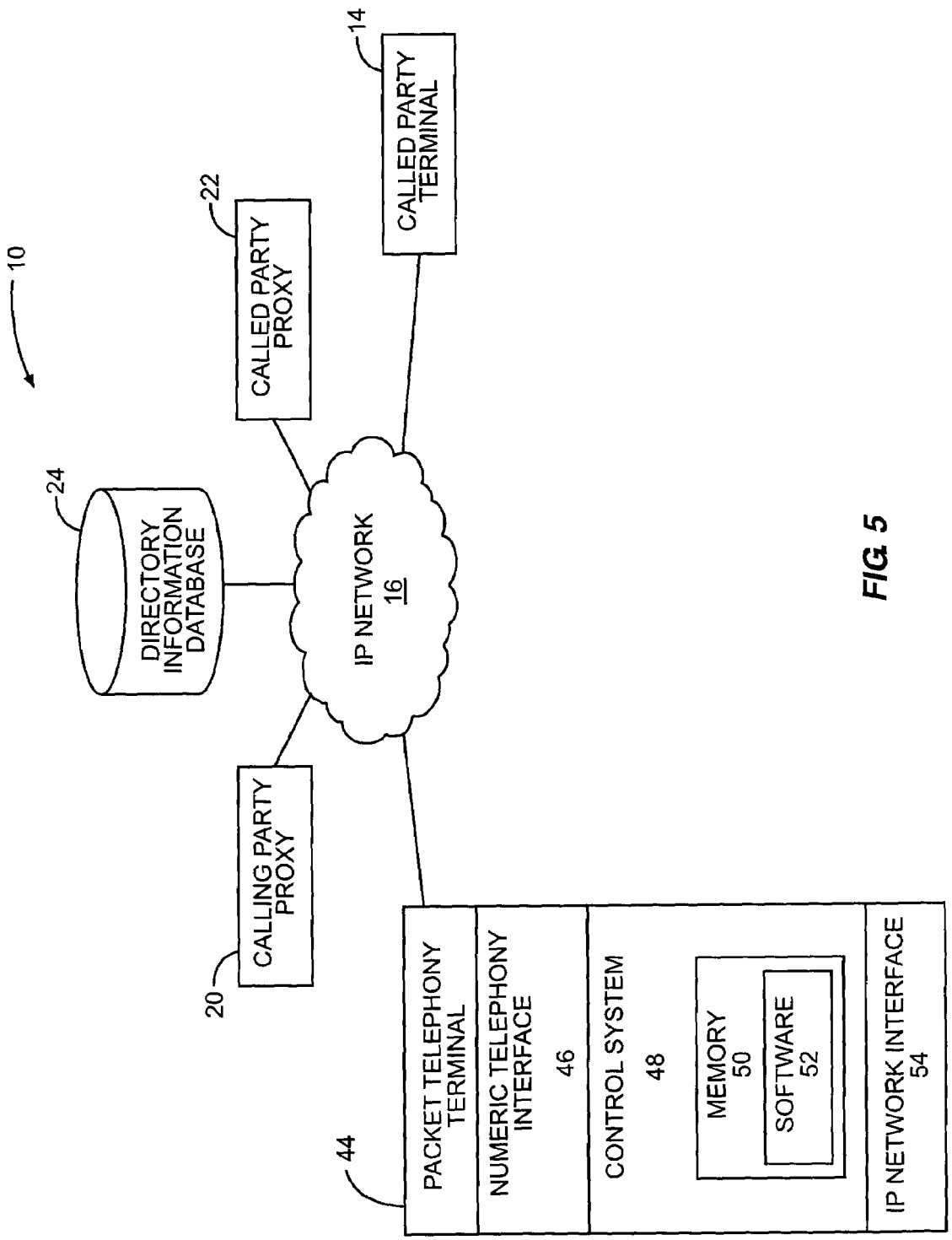
FIG. 5 is a block representation of a communication environment according to a second embodiment of the present invention.

Although the present invention is particularly beneficial in the above environment where the terminal adaptor 18 supports a traditional telephone 12, the concepts of the present invention may be extended to a packet telephony terminal 44 as illustrated in FIG. 5. The packet telephony terminal 44 has a basic numeric telephony interface 46, such as a traditional 10-key numeric keypad including the numbers 0-9 along with the * and # keys. Those skilled in the art will recognize that any telephony device that has restricted capability for entering non-numeric characters will benefit from the spread dial capabilities described above. As such, the packet telephony terminal 44 may effectively integrate the functionality of the terminal adaptor 18 and the traditional telephone 12 and provide the speed dial capabilities described above. In operation, the packet telephony terminal 44 will receive a speed dial code, such as 12#, from a user via the numeric telephony interface 46, and use the speed dial code to attempt to initiate a session over the IP network 16. The calling party proxy 20 will intercept the session request, recognize the speed dial code in the session request, and access an address, such as a URL or IP address, associated with the speed dial code. The calling party proxy 20 will then use the address corresponding to the speed dial code to initiate a session between the packet telephony terminal 44 and another device to facilitate the call. In this embodiment, there is no need for a translation between the IP network 16 and a traditional telephony interface, as the packet telephony terminal 44 may act as a standalone telephony device.

In addition to the numeric telephony interface 46, the packet telephony terminal 44 will include a control system 48 having memory 50 for storing the software 52 necessary for operation. An IP network interface 54 is associated with the control system 48 to facilitate packet communications over the IP network 16.

Those skilled in the art will recognize improvements and modifications to the preferred embodiments of the present invention. All such improvements and modifications are considered within the scope of the concepts disclosed herein and the claims that follow.

What is claimed is:

1. A method of facilitating speed dialing comprising:
 a) accessing an address corresponding to a speed dial code that comprises an abbreviated telephone number sequence, said speed dial code being initially dialed from a PSTN-based telephony device; and
 b) sending a session initiation request including the address to initiate a voice session between a called party terminal associated with the address and the PSTN-based telephony device.

2. The method of claim 1 further comprising receiving an initial session initiation request including the speed dial code.

3. The method of claim 2 wherein the initial session initiation request is received over an Internet Protocol based network from a terminal adapter, which operatively connects the PSTN-based telephony device to the Internet Protocol based network.

4. The method of claim 2 wherein the speed dial coded is provided in a first field of the initial session initiation request, the first field intended to contain the address.

5. The method of claim 4 further comprising determining that the first field of the initial session initiation request includes the speed dial code instead of the address.

6. The method of claim 5 further comprising replacing the speed dial code in the initial session initiation request with the address to create the session initiation request.

7. The method of claim 6 further comprising:
 a) receiving a second session initiation request, which includes a second address in the first field; and
 b) sending the second session initiation request including the second address to initiate a second voice session.

8. The method of claim 1 further comprising accessing the speed dial code by:
   a) requesting the address using the speed dial code from a directory information database; and
   b) receiving the address from the directory information database.

9. A method of facilitating speed dialing comprising:
   a) receiving a speed dial code from a PSTN-based telephony device, wherein the speed dial code comprises an abbreviated telephone number sequence;
   b) sending an initial session initiation request including the speed code over an Internet Protocol based network; and
   c) facilitating a voice session over the Internet Protocol based network with a called party terminal and a voice connection with the PSTN-based telephony device to facilitate a call between the PSTN-based telephony device and the called party terminal.

10. The method of claim 9 wherein the speed dial code is provided in a first field of the initial session initiation request, the first field intended to contain an address associated with the called party terminal.

11. The method of claim 9 wherein the speed dial code is received from the PSTN-based telephony device over a PSTN-based telephony line in the form of dialed digits.

12. A system for facilitating speed dialing comprising:
   a) at least one communication interface; and
   b) a control system associated with the at least one communication interface and adapted to:
      i) access an address corresponding to a speed dial code comprising an abbreviated telephone number sequence, said speed dial code being initially dialed by a user of a PSTN-based telephone device; and
      ii) send a session initiation request including the address to initiate a voice session between a called party terminal associated with the address and the PSTN-based telephony device.

13. The system of claim 12 wherein the control system is further adapted to receive an initial session initiation request including the speed dial code.

14. The system of claim 13 wherein the initial session initiation request is received over an Internet Protocol based network from a terminal adapter, which operatively connects the PSTN-based telephony device to the Internet Protocol based network.

15. The system of claim 13 wherein the speed dial code is provided in a first field of the initial session initiation request, the first field intended to contain the address.

16. The system of claim 15 wherein the control system is further adapted to determine that the first field of the initial session initiation request includes the speed dial code instead of the address.

17. The system of claim 16 wherein the control system is further adapted to replace the speed dial code in the initial session initiation request with the address to create the session initiation request.

18. The system of claim 17 wherein the control system is further adapted to:
   a) receive a second session initiation request, which includes a second address in the first field; and
   b) send the second session initiation request including the second address to initiate a second voice session.

19. The system of claim 12 wherein to access the speed dial code, the control system is further adapted to:
   a) request the address using the speed dial code from a directory information database; and
   b) receive the address from the directory information database.

20. A system for facilitating speed dialing comprising:
   a) an Internet Protocol communication interface;
   b) a PSTN-based telephony network interface supporting a PSTN-based telephony device; and
   c) a control system associated with the Internet Protocol communication interface and the PSTN-based telephony interface and adapted to:
      i) receive a speed dial code from the PSTN-based telephony device, wherein the speed second dial code comprises an abbreviated telephone number sequence;
      ii) send an initial session request including the speed dial code over an Internet Protocol based network; and
      iii) facilitate a voice session over the Internet Protocol based network with a called party terminal and a voice connection with the PSTN-based telephony device to facilitate a call between the PSTN-based telephony device and the called party terminal.

21. The system of claim 20 wherein the speed dial code is provided in a first field of the initial session initiation request, the first field intended to contain an address associated with the called party terminal.

22. The system of claim 20 wherein the speed dial code is received from the PSTN-based telephony device over a PSTN-based telephony line in the form of dialed digits.

23. A method of facilitating speed dialing comprising:
   a) accessing an address corresponding to a speed dial code comprising an abbreviated telephone number sequence, said speed dial code being initially dialed by a user of a telephony device having a primarily numeric keypad; and
   b) sending a session initiation request including the address to initiate a voice session between a called party terminal associated with the address and the telephony device.

24. The method of claim 23 further comprising receiving a initial session initiation request including the speed dial code.

25. The method of claim 24 wherein the initial session initiation request is received over an Internet Protocol based network from the telephony device.

26. The method of claim 24 wherein the speed dial code is provided in a first field of the initial session request, the first field intended to contain the address.

27. The method of claim 26 further comprising determining that the first field of the initiation session initiation request includes the speed dial code instead of the address.

28. The method of claim 27 further comprising replacing the speed dial code in the initial session initiation request with the address to create the session initiation request.

29. The method of claim 23 further comprising accessing the speed dial code by:
   requesting the address using the speed dial code from a directory information database; and
   b) receiving the address from the directory information database.

30. A system for facilitating speed dialing comprising:
   a) at least one communication interface; and
   b) a control system associated with the at least one communication interface and adapted to:
      i) access an address corresponding to a speed dial code comprising an abbreviated telephone number sequence, said speed dial code being initially entered by a user via a primarily numeric keypad of a telephony device; and ii) send a session initiation request including the address to initiate a voice session between a called party terminal associated with the address and the telephony device.

31. The system of claim 30 wherein the control system is further adapted to receive an initial session initiation request including the speed dial code.

32. The system of claim 31 wherein the initial session initiation request is received over an Internet Protocol based network from the telephony device.

33. The system of claim 31 wherein the wherein the speed dial code is provided in a first field of the initial session initiation request, the first field intended to contain the address.

34. The system of claim 33 wherein the control system is further adapted to determine that the first field of the initial session initiation request includes the speed dial code instead of the address.

35. The system of claim 34 wherein the control system is further adapted to replace the speed dial code in the initial session initiation request with the address to create the session initiation request.

36. The system of claim 31 wherein to access the speed dial code, the control system is further adapted to:
   a) request the address using the speed dial code from a directory information database; and
   b) receive the address from the directory information database.

37. A system for facilitating speed dialing comprising:
   a) an Internet Protocol communication interface;
   b) a primarily numeric keypad; and
   c) a control system associated with the Internet Protocol communication interface and the primarily numeric keypad and adapted to:
      i) receive a speed dial code entered via the primarily numeric keypad, wherein the speed dial code comprises an abbreviated telephone number sequence;
      ii) send an initial session incitation request including the speed dial code over an Internet Protocol based network; and
      iii) facilitating a voice session over the Internet Protocol based network with a called party terminal.

38. The system of clam 37 wherein the speed dial code is provided in a first field of the initial session initiation request, the first field intended to contain an address associated with the called party terminal.

39. The system of claim 37 wherein the speed dial code is received from the PSTN-based telephony device over a PSTN-based telephony line in the form of dialed digits.

* * * * *